(12) United States Patent
Tsukada (10) Patent No.: US 10,116,820 B2
(45) Date of Patent: Oct. 30, 2018

(54) IMAGE FORMING APPARATUS, METHOD FOR CONTROLLING SAME, AND STORAGE MEDIUM

(71) Applicant: CANON KABUSHIKI KAISHA, Tokyo (JP)

(72) Inventor: Yoshihiro Tsukada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/634,999

(22) Filed: Jun. 27, 2017

(65) Prior Publication Data

US 2018/0007224 A1 Jan. 4, 2018

(30) Foreign Application Priority Data

Jun. 30, 2016 (JP) .................................. 2016-130610

(51) Int. Cl.
*G06F 15/00* (2006.01)
*H04N 1/00* (2006.01)

(52) U.S. Cl.
CPC ..... *H04N 1/00811* (2013.01); *H04N 1/00204* (2013.01); *H04N 1/00384* (2013.01); *H04N 1/00411* (2013.01); *H04N 2201/0094* (2013.01)

(58) Field of Classification Search
CPC ........... H04N 1/00204; H04N 1/00384; H04N 2201/0094; H04N 1/00811; H04N 1/00411

USPC ........................................................ 358/1.15
See application file for complete search history.

(56) References Cited

U.S. PATENT DOCUMENTS

| 2009/0097061 | A1* | 4/2009 | Kaneko | H04N 1/00344 358/1.15 |
| 2014/0368854 | A1* | 12/2014 | Iwadate | G06K 15/027 358/1.13 |
| 2016/0277605 | A1* | 9/2016 | Sato | H04N 1/00344 |

FOREIGN PATENT DOCUMENTS

JP 2015-2372 A 1/2015

\* cited by examiner

*Primary Examiner* — Saeid Ebrahimi Dehkordy
(74) *Attorney, Agent, or Firm* — Canon U.S.A., Inc. IP Division (57) ABSTRACT

An image forming apparatus to function as an input unit configured to input image data, a printing unit configured to print an image based on the image data input by the input unit, a control unit configured to perform control to, if the image forming apparatus operates in a first mode, print by the printing unit an image generated from the image data input by the input unit, and if the image forming apparatus operates in a second mode, print by the printing unit an image obtained by adding a predetermined pattern image to the image generated from the image data input by the input unit, and an accepting unit configured to, if the image forming apparatus operates in the second mode, accept selection regarding whether to perform printing in the second mode in response to operation performed to start printing the image.

10 Claims, 9 Drawing Sheets

IMAGE FORMING APPARATUS, METHOD FOR CONTROLLING SAME, AND STORAGE MEDIUM

BACKGROUND

Field of Art

The present disclosure relates to an image forming apparatus, a method for controlling the same, and a storage medium.

Description of the Related Art

Image forming apparatuses having printing functions, such as a print function and a copy function, have conventionally had an operation mode in which servicepersons use the image forming apparatuses. The operation mode for servicepersons to use is a mode for adjusting output colors of the image forming apparatus and making adjustments to resolve abnormalities such as an image disorder occurring in a print product.

After making adjustments in such a mode, the servicepersons perform test printing in a confirmation printing mode which is intended to check whether the image forming apparatus operates normally. In the confirmation printing mode, arbitrary image data may be input from a personal computer (PC) used by a user to the image forming apparatus for printing. A copy of an arbitrary image may be made.

In the foregoing test printing, the output print product (a test print) needs to be identifiable as one printed by test printing. Superimposing a predetermined pattern image such as a grid pattern on image data to be printed and outputting the image data has thus been discussed. Japanese Patent Application Laid-Open No. 2015-2372 discusses displaying the setting of the confirmation printing mode on a menu screen or a basic screen for making settings of each function when the confirmation printing mode is set.

General users other than servicepersons are often unaware of the existence of the confirmation printing mode used by the servicepersons to do test printing. Such general users may make an operation for printing without checking the display of the setting of the confirmation printing mode on the menu screen or basic screen when the confirmation printing mode is set.

SUMMARY

According to an aspect of an embodiment, an image forming apparatus includes a processor, and a memory storing instructions, when executed by the processor, causing the image forming apparatus to function as an input unit configured to input image data, a printing unit configured to print an image based on the image data input by the input unit, a control unit configured to perform control to, if the image forming apparatus operates in a first mode, print by the printing unit an image generated from the image data input by the input unit, and if the image forming apparatus operates in a second mode, print by the printing unit an image obtained by adding a predetermined pattern image to the image generated from the image data input by the input unit, and an accepting unit configured to, if the image forming apparatus operates in the second mode, accept selection regarding whether to perform printing in the second mode in response to operation performed to start printing the image.

Features of the present invention will become apparent from the following description of exemplary embodiments with reference to the attached drawings.

DESCRIPTION OF THE EMBODIMENTS

Figure 1:
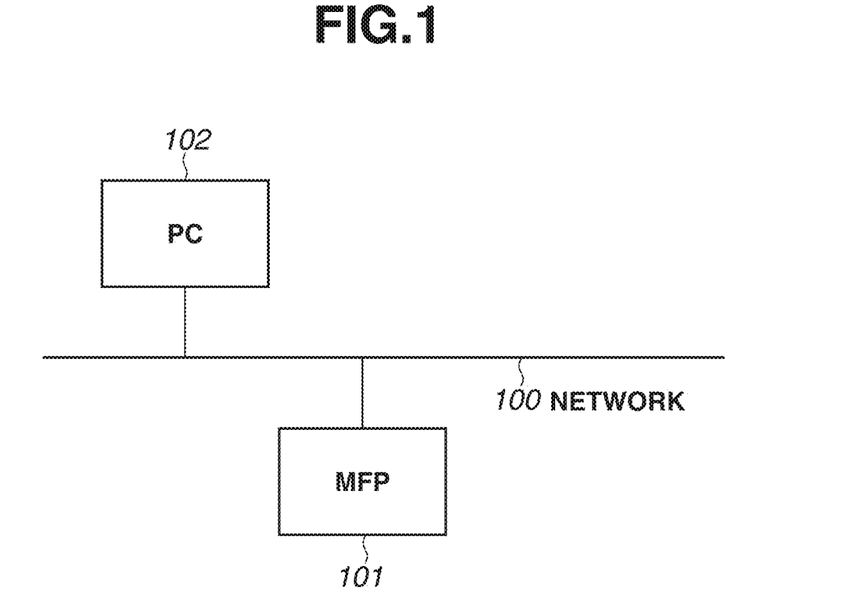
FIG. 1 is a block diagram illustrating an image forming system.

A first exemplary embodiment described in the present specification will initially be described. FIG. 1 is block diagram illustrating an image forming system according to the present exemplary embodiment. A multifunction peripheral (MFP) 101 and a PC 102 are communicably connected to each other on a network 100. The present exemplary embodiment will be described by using the MFP 101 as an example of an image forming apparatus and the PC 102 as an example of an information processing apparatus. The MFP 101 and the PC 102 are connected to the Internet (not illustrated) via the network 100. The MFP 101 can receive print data from the PC 102.

The PC 102 will initially be described. A printer driver (not illustrated) is installed on the PC 102. The PC 102 can transmit generated print data to an external apparatus (in the present exemplary embodiment, the image forming apparatus 101) via the network 100.

Next, the MFP 101 will be described. The MFP 101 includes a scanner which reads an image on a sheet, and a printing unit which prints the image read by the scanner. The MFP 101 uses the scanner and the printing unit to implement functions such as a scan function, a copy function, and a print function.

Figure 2:
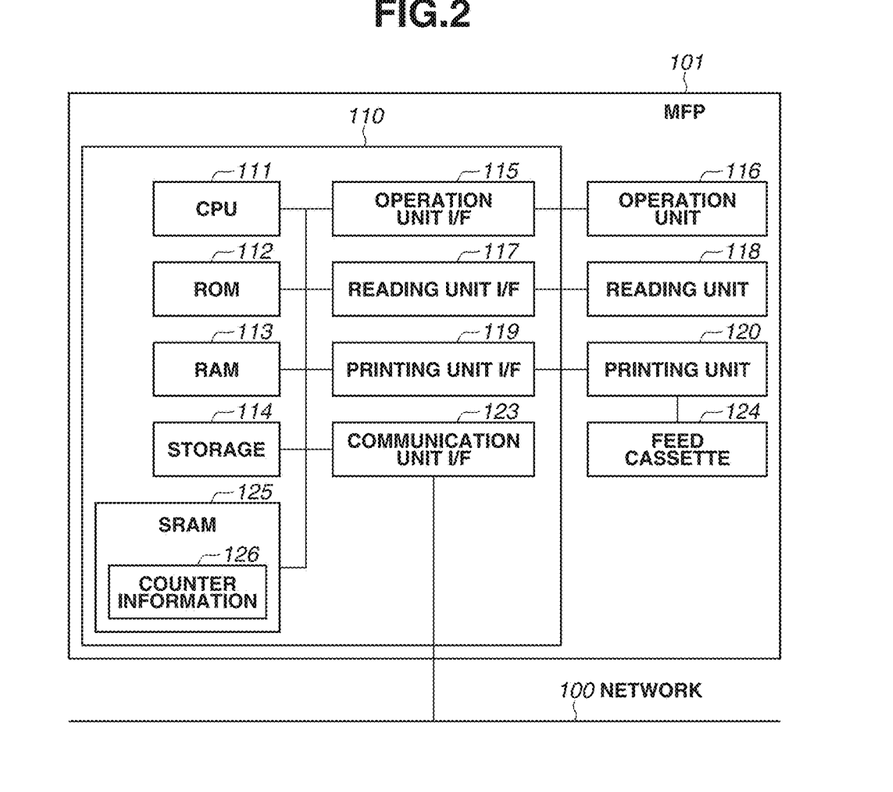
FIG. 2 is a block diagram illustrating a configuration of a multifunction peripheral (MFP) according to an exemplary embodiment.

FIG. 2 is a block diagram illustrating a configuration of the MFP 101 according to the present exemplary embodiment. A control unit 110 including a central processing unit (CPU) 111 acting as a processor controls an operation of the entire MFP 101. The CPU 111 reads a control program stored in a read-only memory (ROM) 112 or a storage 114, and controls various units including a reading unit 118 and the printing unit 120. The ROM 112 stores a control program executable by the CPU 111. The ROM 112 also stores a boot sequence and font information. A random access memory (RAM) 113 is a main memory of the CPU 111 and is used as a work area. The RAM 113 is also used as a temporary storage area for loading various control programs stored in the ROM 112 and the storage 114. The storage 114 stores image data, print data, various programs, and various types of setting information. In the present exemplary embodiment, the storage 114 is described to be a flash memory. However, an auxiliary storage device other than a flash memory, such as a solid state drive (SSD) and a hard disk drive (HDD), may be used. The processor may be configured to include one or more integrated logic circuits that are used separately or in combination to act as a processor to execute instructions that are stored in memory.

The MFP 101 according to the present exemplary embodiment executes processing illustrated in flowcharts to be described below by using one CPU 111 and one memory (RAM 113). However, other configurations may be employed. For example, the processing illustrated in the flowcharts to be described below may be executed by cooperation of a plurality of CPUs, RAMs, ROMs, and storages. Part of the processing may be executed by using a hardware circuit such as an application specific integrated circuit (ASIC) and a field-programmable gate array (FPGA).

An operation unit interface (I/F) 115 connects an operation unit 116 with the control unit 110. The operation unit 116 includes a display such as a liquid crystal display (LCD), and an input device such as a touch panel. The operation unit 116 displays information about the image forming apparatus to a user, and accepts input from the user.

A reading unit I/F 117 connects a reading unit 118 with the control unit 110. The reading unit 118 reads an image on a sheet, and converts the image into image data such as binary data. The image data generated by the reading unit 118 is transmitted to an external apparatus such as the PC 102 via the network 100, or printed on a sheet. The reading unit I/F 117 may be configured as an input unit that receives image data.

A printing unit I/F 119 connects a printing unit 120 with the control unit 110. The CPU 111 transfers image data to be printed to the printing unit 120 via the printing unit I/F 119. The printing unit 120 prints the received image on a sheet fed from a feed cassette 124.

The control unit 110 is connected to the network 100 via a communication unit I/F 123. The communication unit I/F 123 transmits image data and information to an external apparatus on the network 100, and receives print data and information from the information processing apparatus on the network 100.

Examples of a method for transmitting and receiving print data via the network 100 include transmission and reception using electronic mail. Other examples include transmission and reception using protocols such as the File Transfer Protocol (FTP) and Server Message Block (SMB). The MFP 101 can also transmit and receive facsimile data to/from an external facsimile apparatus via a modem and the public switched telephone network (PSTN).

A static random access memory (SRAM) 125 is a nonvolatile storage medium. The SRAM 125 stores various types of counter information 126, including information about a charging counter and a non-charging counter of the MFP 101. The MFP 101 described in the present exemplary embodiment is an MFP that charges the user based on the number of sheets printed by the user. For that purpose, the MFP 101 includes a charging counter for managing the number of sheets printed by the user. Test printing done by a serviceperson after adjustment to a print image is not printing performed by the user, and thus needs to be excluded from the charging count. The MFP 101 then includes a non-charging counter for counting test prints made by the serviceperson which are not to be charged.

A mechanism for charging management by the MFP 101 having the foregoing configuration will be briefly described.

The MFP 101 prints image data input via the network 100 and the communication unit I/F 123 or via the reading unit 118 by the printing unit 120. The communication unit I/F 123 may be configured as an input unit that receives image data. Other components of the MFP 101 may also be configured to receive image data. Each time the printing unit 120 prints print data on a sheet, the count of the charging counter for counting the number of printed sheets of print products to be charged is incremented by one and updated. The external PC 102 can obtain information about the number of printed sheets counted by the charging counter. Based on the information, the amount of money to charge the user of the MFP 101 is determined afterward.

The MFP 101 according to the present exemplary embodiment has three operation modes, a "normal mode", a "maintenance mode", and a "confirmation printing mode".

The "normal mode" is an operation mode in which a general user operates the MFP 101 to use the copy, print, scan, and facsimile functions.

The "maintenance mode" is an operation mode in which the serviceperson uses the MFP 101. This operation mode is intended for the serviceperson to do maintenance work of the MFP 101. The maintenance work includes, for example, an operation performed by the serviceperson for checking or modifying settings of various parameters of the MFP 101 when an image disorder or color shift occurs. The maintenance work also includes for printing a test pattern for image adjustment. The maintenance work also includes checking counter information for counting the number of printed sheets of print products and the versions of the firmware and software of the MFP 101.

The "confirmation printing mode" is a mode in which the serviceperson uses the copy and print functions. Such a mode is used when the serviceperson performs normal copying and printing after maintenance such as image color adjustment. The serviceperson checks the printed result for color and image disorder, and determines whether the adjustment is properly done. The printing for checking the printed result of the printing unit 120 in the confirmation printing mode is test printing. During test printing, a predetermined pattern such as a grid pattern is superimposed and printed on the image to be printed to produce a test print. The superimposition and printing of such a predetermined pattern can facilitate identifying which print product is that of the test printing done by the serviceperson.

To set the confirmation printing mode, the serviceperson switches the operation mode from the normal mode to the maintenance mode and then sets the confirmation printing mode from a maintenance menu. To cancel the confirmation printing mode, the serviceperson also once again switches the operation mode to the maintenance mode and ends the confirmation printing mode from the maintenance menu.

Copy jobs and print jobs performed in the maintenance mode and the confirmation printing mode are ones executed by the serviceperson for adjustment of the image forming apparatus. Such jobs are therefore not to be charged. If a copy job or a print job is executed in the maintenance mode or the confirmation printing mode, the image forming apparatus updates the count of the non-charging counter by the number of sheets printed. In the present exemplary embodiment, if test printing to be described below is performed while the maintenance mode is set, the non-charging counter is counted up by the number of sheets printed. However, both the counts of the non-charging and charging counters may be left not updated in the case of test printing.

The MFP 101 operates in any one of the foregoing three operation modes, "normal mode", "maintenance mode", and "confirmation printing mode." Operation screens displayed vary from one operation mode to another. The operation screens in each operation mode will be described below with reference to FIGS. 4A to 4F.

Figure 3:
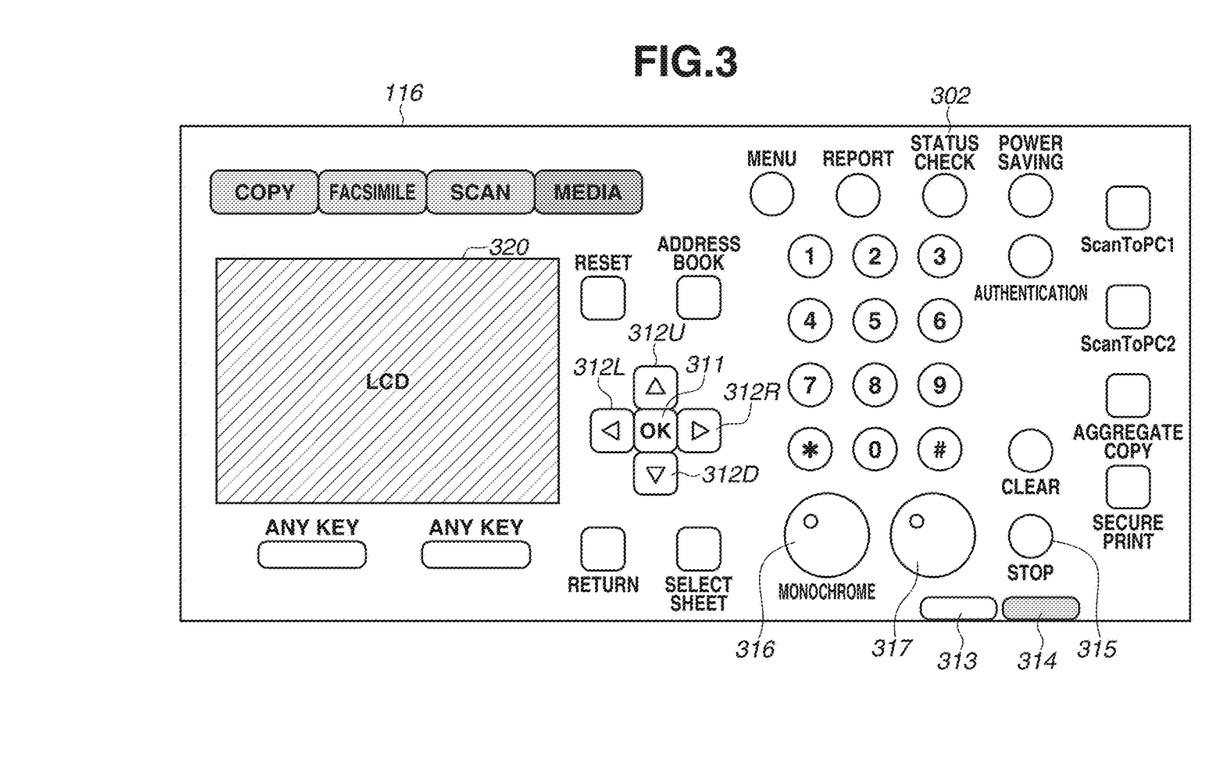
FIG. 3 is an external view illustrating an operation unit according to an exemplary embodiment.

FIG. 3 is an external view illustrating the operation unit 116 of the MFP 101. The operation unit 116 includes a display 320 and various hardware keys. The display 320 displays operation screens to be described below. The display 320 is integrally arranged with a touch panel. For example, light transmittance of the touch panel is configured to not block display of the display 320. The touch panel is attached to the top layer of the display 320. The image forming apparatus associates input coordinates representing the user's touch position on the touch panel with display coordinates on the display 320. Such association allows the user to make operations as if directly touching and operating the screen displayed on the display 320. The display 320 and various hardware keys accept instructions from the user.

The operation unit 116 includes scroll keys 312U, 312D, 312L, and 312R for selecting options on the screen displayed on the display 320, and an OK key 311 for determining the option selected by the scroll keys 312U, 312D, 312L, and 312R. The user can select an item from the options displayed on the screen displayed on the display 320 by using the scroll keys 312 (312U, 312D, 312L, and 312R) and the OK key 311. The user can set an option by directly touching the option displayed on the display 320 with a finger or a touch pen such as a stylus.

A status check key 302 is a key for displaying a screen (status check screen) for checking a state of the MFP 101 on the display 320. The status check screen is a screen for displaying a serial number, information about devices of the MFP 101, and a status of a copy or print job. The information about the devices includes a state of a cartridge. The user can check the state of a print job in process via the status check screen.

Lamps 313 and 314 are intended to notify the user of the state of the MFP 101. The lamp 313 is lit during reception or execution of an electronic mail or a print job. The lamp 314 is lit when an error occurs in the MFP 101.

A stop key 315 can be used to issue an instruction to cancel a job. For example, the stop key 315 is used to stop reception of image data from an external image processing apparatus. If the stop key 315 is pressed during printing, the print processing can be interrupted.

Figure 4A:
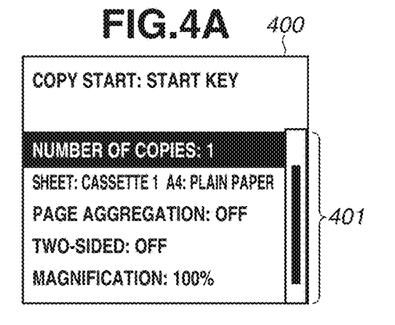
FIGS. 4A, 4B, 4C, 4D, 4E, and 4F are diagrams illustrating operation screens displayed on a display according to an exemplary embodiment.
Figure 4B:
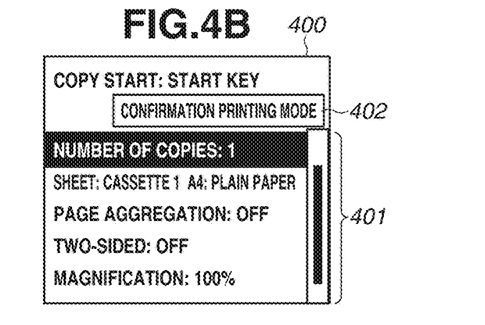

Start keys 316 and 317 are buttons for giving instructions to start a job. If the start key 316 or 317 is pressed in a state in which a basic screen of each function, such as the copy function, the scan function, and the facsimile function, illustrated in FIGS. 4A and 4B is displayed on the display 320, processing according to the function is started. The start key 316 is a monochrome start key. The start key 317 is a color start key. The start keys 316 and 317 are used to issue a job start instruction in a monochrome mode and a color mode, respectively.

The foregoing various keys can be implemented by displaying buttons having similar functions on the display 320 and accepting input to the touch panel.

FIGS. 4A to 4F are diagrams illustrating examples of the operation screens that the CPU 111 displays on the display 320 of the operation unit 116. An operation of the MFP 101 according to the first exemplary embodiment will be described based on the examples of the operation screens displayed on the display 320, illustrated in FIGS. 4A to 4F.

Figure 4C:
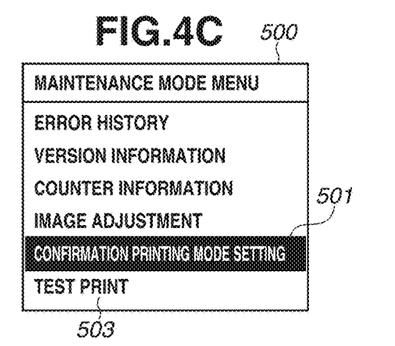
Figure 4D:
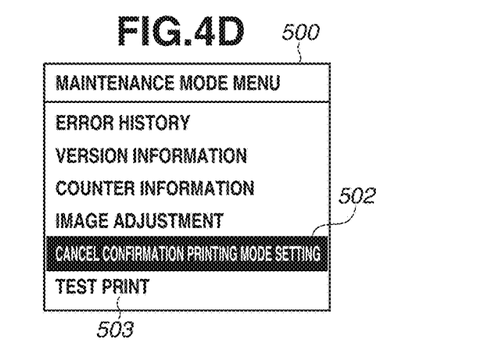
Figure 4E:
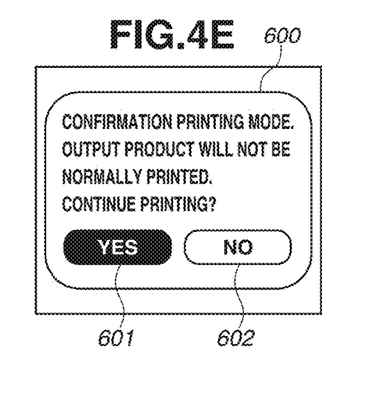
Figure 4F:
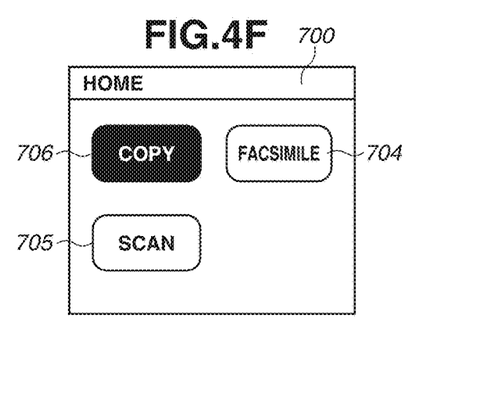

FIG. 4F illustrates a home screen 700. The home screen 700 displays a screen for displaying the basic screens of various functions of the MFP 101. Examples of the various functions include the copy function, the facsimile function, and the scan function. A "copy" button 706 is a button for displaying the basic screen of the copy function. If the user touches or selects the "copy" button 706, the basic screen of the copy function is displayed on the display 320. A "facsimile" button 704 is a button for displaying the basic screen of the facsimile function. A "scan" button 705 is a button for displaying the basic screen of the scan function. The user selects the function to use by operating the scroll keys 312L, 312U, 312R, and 312D, and the OK key 311. The user may select the function to use by touch operation on the display 320 without using the hardware keys. In the present exemplary embodiment, the home screen 700 is described to be that illustrated in FIG. 4F in both the normal and confirmation printing modes. However, when the confirmation printing mode is set, that the confirmation printing mode is set may be displayed on the home screen 700 as illustrated in FIG. 4B to be described below.

FIG. 4A illustrates a basic screen 400 which is the basic screen of the copy function in the normal mode. The basic screen of the copy function illustrated in FIG. 4A is displayed on the display 320 if the "copy" button 706 is selected on the home screen 700 illustrated in FIG. 4F with the normal mode set as the operation mode.

The basic screen 400 of the copy function includes a display field capable of displaying seven lines of character strings. The first line displays a message indicating the screen of which function is displayed. The second line displays information indicating the current mode. In the normal mode, however, the second line does not provide a mode display. Since FIG. 4A illustrates a screen display in the normal mode, no mode display is provided thereon. While in the first exemplary embodiment the second line is described to provide no display in the normal mode, the second line may provide the mode display even in the normal mode.

An area 401 of the third to seventh lines displays some of the setting items of each function. Since the screen of FIG. 4A is an operation screen in using the copy function, some of the setting items corresponding to the copy function are displayed. The item in reverse color represents the currently-selected item. Either of the scroll keys 312U and 312D can be pressed to change the selected item. If the OK key 311 is pressed in a state where an item is selected, the setting of the selected item can be changed. The display 320 may be touched to select and change a setting item.

FIG. 4B illustrates the basic screen of the copy function in the confirmation printing mode. The basic screen of the copy function in the confirmation printing mode illustrated in FIG. 4B is displayed on the display 320 if the "copy" button 706 is selected on the home screen 700 illustrated in FIG. 4F with the confirmation printing mode set as the operation mode.

Since the operation mode of the MFP 101 is the confirmation printing mode, the second line displays that the operation mode is the confirmation printing mode. From such a display, the user or serviceperson can recognize that the current operation mode of the MFP 101 is the confirmation printing mode.

FIGS. 4C and 4D illustrate examples of a maintenance mode menu screen. A maintenance mode menu is displayed if the serviceperson makes an operation for starting the maintenance mode. For example, the operation for starting the maintenance mode may include inputting the serviceperson's identifier (ID) and password to the operation unit 116. Special operations such as long pressing of a key provided on the operation unit 116 and simultaneous pressing of a plurality of keys may be made. Such special operations are known only to servicepersons and not made public to general users.

FIG. 4C illustrates a maintenance mode menu screen that is displayed if the confirmation printing mode is off. A "confirmation printing mode setting" button 501 is a setting item for issuing an instruction to start the confirmation printing mode in the maintenance mode. If the user touches or selects the "confirmation printing mode setting" button 501, the MFP 101 accepts the setting of the confirmation printing mode.

FIG. 4D illustrates a maintenance mode menu screen that is displayed if the confirmation printing mode is on. A "cancel confirmation printing mode setting" button 502 is a setting item for issuing an instruction to end the confirmation printing mode. If the serviceperson touches or selects the "cancel confirmation printing mode setting" button 502, the MFP 101 ends the confirmation printing mode. If a predetermined time elapses after the setting of the confirmation printing mode or a predetermined time elapses without any operation by the serviceperson, the MFP 101 may end the confirmation printing mode. If a predetermined time has elapsed from the last operation of the MFP 101 by the user and the MFP 101 has entered a sleep state, the operation mode may be switched to end the confirmation printing mode when the MFP 101 recovers from the sleep state.

A "test print" button 503 illustrated in FIGS. 4C and 4D is a button for test printing an image for checking a print product for an image disorder and a color shift. Test printing is a job of printing executed in the maintenance mode and is therefore not to be charged. The test print is counted by the non-charging counter in the SRAM 125. Test printing is printing executed in the maintenance mode with a special image for testing to be printed without the superimposition of the grid pattern.

To end the maintenance mode, the serviceperson makes a special key operation so that the MFP 101 enters the normal mode or the confirmation printing mode. Such a special key operation is known only to servicepersons and not made public to general users. The display of the maintenance mode menu screen may be ended if a predetermined time elapses without any operation by the serviceperson.

FIG. 4E illustrates a screen that is displayed if the user presses the start key 316 or 317 on the basic screen 400 illustrated in FIG. 4B when the confirmation printing mode is on. A confirmation screen 600 is an example of a screen for notifying the user that the printing in the confirmation printing mode is different from that in the normal mode according to the first exemplary embodiment. If the user selects "yes", the job is started to perform printing. If the user selects "no", the basic screen 400 of the copy function is displayed on the display 320.

In the present exemplary embodiment, a message "Conformation printing mode. Output product will not be normally printed. Continue printing?" is displayed on the display 320. The message displayed on the display 320, however, is not limited to the foregoing one. For example, a message "Confirmation printing mode is being set. Continue printing?" or "In confirmation printing mode, print product is output with additional grid pattern. Continue printing?" may be displayed. A message for notifying the user that the confirmation printing mode is a mode for maintenance and to be used by the serviceperson, like "Confirmation printing mode is a mode for use during maintenance. Continue printing?", may be displayed. In such a manner, when the user attempts to start printing, the user is notified that the current operation mode is the confirmation printing mode. This can prevent general users from starting printing without being aware that the operation mode during printing is the confirmation printing mode. Displaying what a print product to be printed in the confirmation printing mode is like on the confirmation screen 600 illustrated in FIG. 4E can prevent the user from starting printing without being aware what confirmation printing mode is like.

Figure 5:
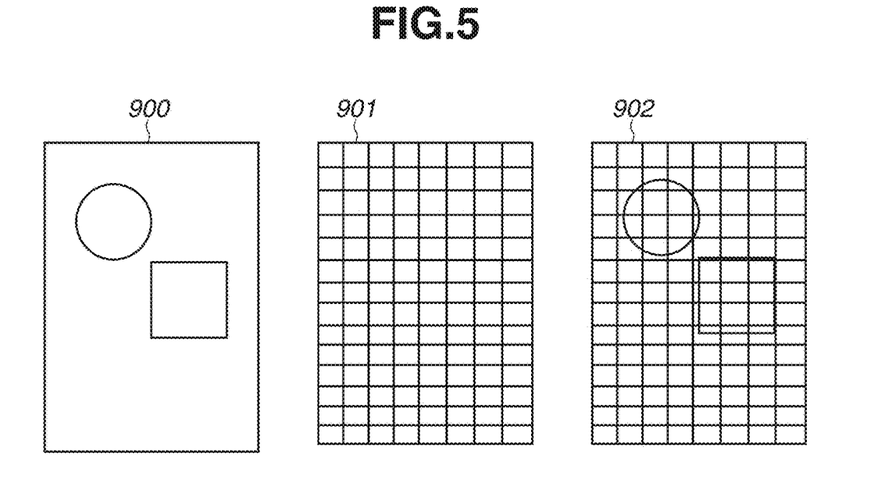
FIG. 5 is a diagram illustrating examples of output images according to an exemplary embodiment.

FIG. 5 is a diagram illustrating examples of images output in the normal mode and the confirmation printing mode.

FIG. 5 illustrates an image 900 which is output in the normal mode. When the normal mode is set, the MFP 101 prints image data read by using the reading unit 118 or image data received via the network 100. If the normal mode is set, the MFP 101 performs printing based on the settings set in the area 401 of the basic screen 400 illustrated in FIG. 4A. For example, in the case of FIG. 4A, printing is performed with such settings as the number of copies "1" and a sheet "A4: plain paper".

FIG. 5 illustrates an example of a pattern image 901 to be superimposed on image data when the confirmation printing mode is set. In the present exemplary embodiment, the grid pattern of the pattern image 901 is described to be superimposed on image data read by using the reading unit 118 or image data received via the network 100.

FIG. 5 illustrates an example of a print product 902 that is output in the confirmation printing mode. In the confirmation printing mode, an image generated from the image data read by the reading unit 118 or the image data received via the network 100 is output with the grid pattern superimposed thereon. If the confirmation printing mode is set, the pattern image 901 is superimposed and printed on the entire sheet to be printed, aside from the settings set in the area 401 of the basic screen 400 illustrated in FIG. 4B. In the confirmation printing mode, the grid pattern is thus superimposed as a specific pattern on the generated image to clearly demonstrate that the resultant print product is a test print produced by the serviceperson.

Figure 6:
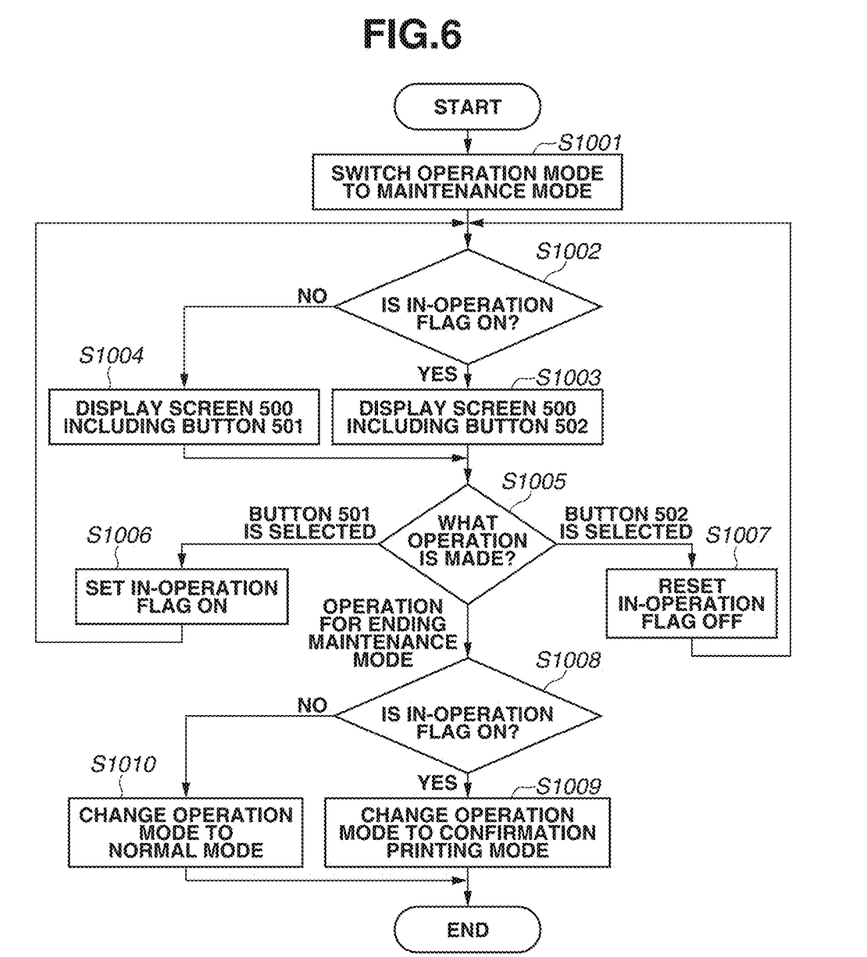
FIG. 6 is a diagram for describing transitions of an operation mode of the MFP according to an exemplary embodiment.

FIG. 6 is a flowchart for describing transitions of the operation mode of the MFP 101. The processing procedure illustrated in FIG. 6 is started as the MFP 101 starts the maintenance mode. The method by which the MFP 101 starts the maintenance mode is as described above. The serviceperson makes a special operation to start the maintenance mode.

A program for executing the processing illustrated in FIG. 6 is stored in the ROM 112 or the storage 114. The CPU 111 loads the program stored in the ROM 112 or the storage 114 into the RAM 113, and executes the program to implement the processing.

The serviceperson makes a special operation for entering the maintenance mode on the operation unit 116 of the MFP 101. The special operation is known to only servicepersons. In step S1001, the CPU 111 switches the operation mode of the MFP 101 to the maintenance mode.

In step S1002, the CPU 111 determines whether an in-operation flag stored in the RAM 113 is on or off. The in-operation flag is a control flag (off/on) for determining whether the confirmation printing mode of the MFP 101 is set. The CPU 111 initializes the control flag about the setting of the confirmation printing mode to off when the MFP 101 is activated. If the MFP 101 enters the maintenance mode for the first time after activation, the in-operation flag is therefore off.

If the in-operation flag is off (NO in step S1002), the processing proceeds to step S1004. In step S1004, the CPU 111 displays the screen 500 including the "confirmation printing mode setting" button 501 of FIG. 4C on the display 320.

On the other hand, if the in-operation flag is on (YES in step S1002), the processing proceeds to step S1003. In step S1003, the CPU 111 displays the screen 500 including the "cancel confirmation printing mode setting" button 502 of FIG. 4D on the display 320.

In step S1005, the CPU 111 determines what operation is made by the user. The flowchart of FIG. 6 deals with cases where the operation made by the user is any one of operations for pressing the "confirmation printing mode setting" button 501, pressing the "cancel confirmation printing mode setting" button 502, and ending the maintenance mode. For other operations, the CPU 111 performs processing corresponding to the respective items. A description thereof will be omitted in the present flowchart.

If the CPU 111 determines that the "confirmation printing mode setting" button 501 is pressed (BUTTON 501 IS SELECTED in step S1005), the processing proceeds to step S1006. In step S1006, the CPU 111 sets the in-operation flag on. The processing then returns to step S1002. In step S1003, the CPU 111 displays the "cancel confirmation printing mode setting" button 502 on the display 320. In step S1005, the CPU 111 accepts the next operation.

If the CPU 111 determines that the "cancel confirmation printing mode setting" button 502 is pressed (BUTTON 502 IS SELECTED in step S1005), the processing proceeds to step S1007. In step S1007, the CPU 111 resets the in-operation flag off. The processing then returns to step S1002. In step S1004, the CPU 111 displays the "confirmation printing mode setting" button 501 according to the in-operation flag. In step S1005, the CPU 111 accepts the next operation.

If the CPU 111 determines that an operation for ending the maintenance mode is accepted (OPERATION FOR ENDING MAINTENANCE MODE in step S1005), the processing proceeds to step S1008. In step S1008, the CPU 111 determines whether the in-operation flag is on. Whether an operation for ending the maintenance mode is accepted is determined based on the determination of whether the serviceperson operates a not-illustrated key or keys via the operation unit 116. Display of a maintenance mode screen may be ended if a predetermined time elapses without any operation by the serviceperson.

If the in-operation flag is on (YES in step S1008), the processing proceeds to step S1009. In step S1009, the CPU 111 changes the operation mode to the confirmation printing mode. The CPU 111 displays the home screen 700 illustrated in FIG. 4F on the display 320. In the present exemplary embodiment, the CPU 111 is described to change the operation mode to the confirmation printing mode and then display the home screen 700. However, after the change of the display mode, the CPU 111 may display on the display 320 a screen corresponding to that displayed on the display 320 when the operation for starting the maintenance mode is made by the user. For example, suppose that the basic screen 400 of the copy function illustrated in FIG. 4A is displayed when the operation for starting the maintenance mode is made by the user. In such a case, after the end of the maintenance mode, the basic screen 400 of the copy function in the confirmation printing mode, illustrated in FIG. 4B, may be displayed on the display 320.

If the in-operation flag is off when the operation for ending the maintenance mode is made (NO in step S1008), the processing proceeds to step S1010. In step S1010, the CPU 111 changes the operation mode to the normal mode. The CPU 111 displays the home screen 700 illustrated in FIG. 4F on the display 320. In the present exemplary embodiment, the CPU 111 is described to enter the normal mode and then display the home screen 700 on the display 320. However, after the operation mode is changed to the normal mode, the CPU 111 may display on the display 320 a screen corresponding to that displayed on the display 320 when the operation for starting the maintenance mode is made. For example, suppose that the operation for starting the maintenance mode is made on the basic screen 400 of the copy function illustrated in FIG. 4A. In such a case, the CPU 111 displays the basic screen 400 of the copy function illustrated in FIG. 4A after the end of the maintenance mode.

By executing the processing illustrated in FIG. 6, the CPU 111 can set the operation mode to the confirmation printing mode or the normal mode.

Figure 7:
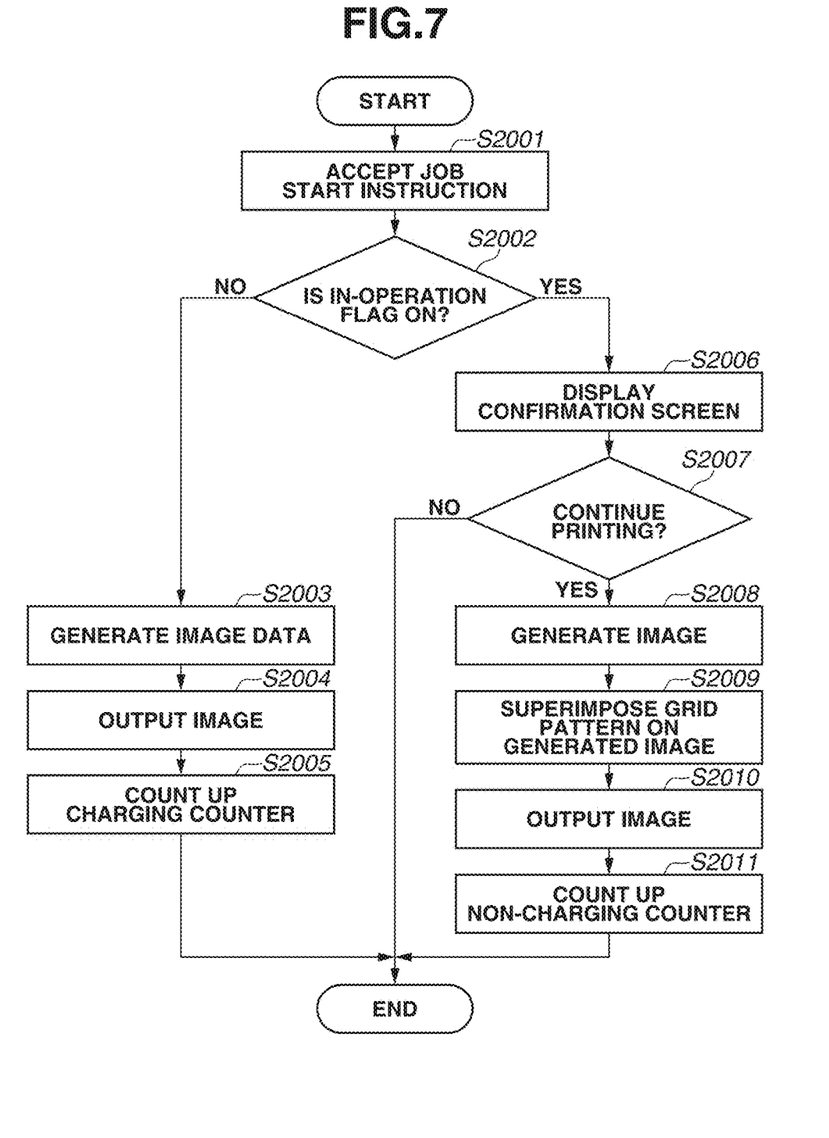
FIG. 7 is a flowchart illustrating processing according to a first exemplary embodiment.

FIG. 7 is a flowchart illustrating processing for receiving a job start instruction on the basic screen of each function and then outputting an image. A program for executing the steps of the flowchart illustrated in FIG. 7 is stored in the ROM 112 or the storage 114. The CPU 111 loads the program stored in the ROM 112 or the storage 114 into the RAM 113 and executes the program to implement the processing of the flowchart illustrated in FIG. 7. The CPU 111 performs control corresponding to the flowchart illustrated in FIG. 7 if an operation for starting a job is determined to be made via the hardware keys and the display 320 of the operation unit 116.

The flowchart illustrated in FIG. 7 is started if the user selects a function related to printing on the home screen 700 illustrated in FIG. 4F and the CPU 111 displays the basic screen of the selected function on the display 320. Examples of the function related to printing include the copy function and the facsimile function.

In step S2001, the CPU 111 accepts a job start instruction involving printing from the operation unit 116. Examples of the job start instruction involving printing include pressing of the start key 316 or 317 on the basic screen 400 of the copy function illustrated in FIG. 4A. If the user presses the start key 316 or 317, the CPU 111 receives the job start instruction.

In step S2002, the CPU 111 determines whether the in-operation flag of the MFP 101 is on. If the operation mode is the normal mode, the in-operation flag is off. If the in-operation flag is off (NO in step S2002), the processing proceeds to step S2003. In step S2003, the CPU 111 generates image data based on print settings set by the user about a print job for which the job start instruction is given in step S2001. The print settings set by the user refer to the settings made by the user in the area 401 when the basic screen 400 is displayed on the display 320.

In step S2004, the CPU 111 generates an image based on the print settings set by the user, and then simply outputs the generated image.

In step S2005, after the output of the image is completed, the CPU 111 counts up the charging counter. The CPU 111 counts up the charging counter by one for each sheet printed. While in the present exemplary embodiment the charging counter is described to be counted up by one for each sheet printed, the charging counter may be incremented by one for each job. The charging counter may be counted up according to the amount of toner or ink used.

In step S2002, if the operation mode is the confirmation printing mode, the in-operation flag is set to on (YES in step S2002). The processing then proceeds to step S2006. In step S2006, the CPU 111 displays on the display 320 the confirmation screen 600 notifying the user that the currently-set operation mode is the confirmation printing mode and making the user select whether to execute printing. Notifying the user that the currently-set operation mode is the confirmation printing mode allows the user who attempts to start printing without being aware that the confirmation printing mode is in operation to be informed that the current operation mode is the confirmation printing mode. The user can also be notified that in the confirmation printing mode, a print product different from one in the normal mode is output. As a result, the user who does not know what a print product to be output in the confirmation printing mode is like can be informed that a print product different from one in the normal mode is printed.

In step S2007, after the confirmation screen 600 is displayed on the display 320, the CPU 111 determines whether the user selects to continue printing. As illustrated in FIG. 4E, the CPU 111 allows the user to select whether to continue printing, after the confirmation screen 600 is displayed on the display 320. If the user wants to print a print product similar to one in the normal mode, the user can abort the printing in the confirmation printing mode.

If the user selects not to continue printing on the confirmation screen 600 (NO in step S2007), the processing related to printing (print processing) is ended. After the end of the processing related to printing, the CPU 111 displays the basic screen of the function that is displayed on the display 320 when the job start instruction is accepted. For example, suppose that the user presses the start key 316 or 317 on the basic screen 400 of the copy function in the confirmation printing mode, illustrated in FIG. 4B. In such a case, after the abortion of the print processing, the basic screen 400 illustrated in FIG. 4B is displayed on the display 320. In the present exemplary embodiment, the CPU 111 is described to display a basic screen on the display 320 if the print processing is aborted. However, after the execution of the processing illustrated in FIG. 7, the CPU 111 may display the home screen 700 on the display 320.

If the user gives an instruction to continue the execution of the function on the confirmation screen 600 (YES in step S2007), the processing proceeds to step S2008. In step S2008, the CPU 111 generates an image to be printed. The image to be printed is an image generated from image data input via the reading unit 118 or image data received from an external image processing apparatus via the network 100. The CPU 111 generates the image to be printed based on such image data and the settings set by the user in the area 401 of the basic screen 400 illustrated in FIG. 4B.

In step S2009, the CPU 111 generates an image by superimposing the grid pattern on the generated image. The grid pattern is superimposed on the image generated in step S2008 regardless of the print settings set by the user, whereby the output print product can be clearly identified as a test print.

In step S2010, the CPU 111 outputs the image on which the gird pattern is superimposed, via the printing unit 120. In step S2011, the CPU 111 counts up the non-charging counter in the SRAM 125. The CPU 111 increments the non-charging counter as many as the number of sheets printed in the confirmation printing mode. During test printing, the non-charging counter can be counted up to clarify the number of sheets used for maintenance. In the present exemplary embodiment, the non-charging counter is counted up as many as the number of sheets printed in the confirmation printing mode. However, the non-charging counter may be counted up for each job or according to the amount of toner or ink used. The number of sheets printed in the confirmation printing mode does not necessarily need to be counted.

After the CPU 111 finishes counting up the non-charging counter and then ends the print processing. After the end of the print processing, the CPU 111 displays the basic screen of the function that is displayed on the display 320 when the job start instruction is accepted. For example, suppose that the CPU 111 accepts the job start instruction on the basic screen 400 of the copy function, illustrated in FIG. 4B. In such a case, after the execution of the processing of step S2011, the CPU 111 displays the basic screen 400 of the copy function on the display 320. In the present exemplary embodiment, the screen displayed when the job start instruction is accepted is described to be displayed on the display 320. However, after the end of the processing of step S2011, the CPU 111 may display the home screen 700 on the display 320.

In the first exemplary embodiment, if printing is performed in the confirmation printing mode, the MFP 101 notifies the user that the currently-set operation mode is the confirmation printing mode. Even if the user is unaware that the operation mode is set to the confirmation printing mode until he or she gives a print start instruction, the user can thus be notified that the current printing mode is the confirmation printing mode. Notifying the user that a print product in the confirmation printing mode is different from one printed in the normal mode allows the user to be informed that a print product to be printed in the confirmation printing mode is different from one printed in the normal mode. The buttons for the user to determine whether to continue printing are displayed on the confirmation screen 600. Even if a general user who wants to perform printing in the normal mode mistakenly gives an instruction to start the job in the confirmation printing mode, the printing of a print product on which a predetermined pattern image not intended by the user is superimposed can thus be prevented from being started.

Now, a second exemplary embodiment will be described. In the first exemplary embodiment, the MFP 101 is described to notify the user that printing is performed in the confirmation printing mode, if the user gives a print instruction in the confirmation printing mode. However, according to such a method, the user remains unaware that the currently-set operation mode is the confirmation printing mode, until the user makes operations up to immediately before the printing of the print job. In the second exemplary embodiment, if the user selects a function capable of executing a print job, such as the copy function and the print function, on the home screen in a state in which the confirmation printing mode is set, the user is notified that the confirmation printing mode is different from the normal mode. Such a notification can inform the user that the currently-set operation mode is the confirmation printing mode, when the user selects the function to use from the home screen.

FIGS. 4A, 4B, 4F, and 8 illustrate examples of screens displayed on the display 320 according to the second exemplary embodiment. Referring to FIGS. 4A, 4B, 4F, and 8, how the display of the display 320 changes according to the second exemplary embodiment will be described.

FIG. 4F illustrates the home screen 700 displayed on the display 320. The home screen 700 displays the buttons for displaying the basic screens of respective functions of the MFP 101 on the display 320. The user selects a function by using the scroll keys 312U, 312R, 312D, and 312L, whereby the basic screen of the selected function is displayed on the display 320. In FIG. 4F, the copy function of which the button is displayed in reverse color is selected.

Figure 8:
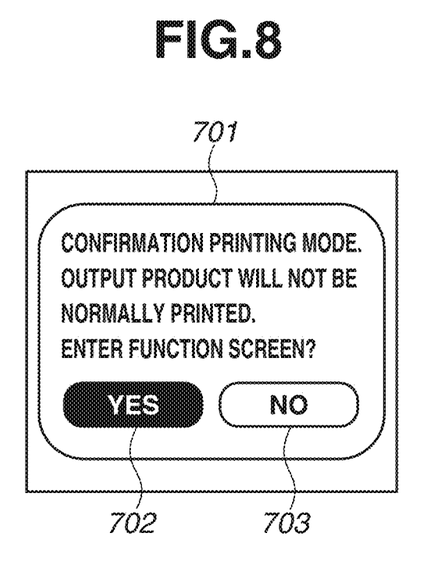
FIG. 8 is a diagram illustrating an operation screen displayed on a display according to a second exemplary embodiment.

In the state illustrated in FIG. 4F in which the copy function is selected, the user presses the OK key 311. If the operation mode of the MFP 101 is the normal mode, the basic screen 400 of the copy function illustrated in FIG. 4A is displayed on the display 320. If the operation mode when the function is selected on the home screen 700 is the confirmation printing mode, a confirmation screen 701 illustrated in FIG. 8 is displayed on the display 320. If the user touches a "yes" button 702 or presses the OK key 311 for selection, the CPU 111 changes the screen displayed on the display 320 to the basic screen 400 of FIG. 4B. The message displayed on the confirmation screen 701 is not limited to that illustrated in FIG. 8. For example, a message such as "Confirmation printing mode is set. Enter function screen?" and "Confirmation printing mode. In this mode, a print product is output with additional grid pattern" may be displayed. A message "Confirmation printing mode. This mode is intended for serviceperson" may be displayed. On the confirmation screen 701 illustrated in FIG. 8, if the user touches a "no" button 703 or presses the OK key 311 for selection, the CPU 111 displays the home screen 700 illustrated in FIG. 4F on the display 320. Since the confirmation screen 701 is displayed on the display 320 before the basic screen of each function is displayed, the user can be notified that the current operation mode is the confirmation printing mode. The user is also notified what a print product to be printed is like when the confirmation printing mode is set. This enables even a general user to know what a print product to be printed in the confirmation printing mode is like.

In the second exemplary embodiment, the serviceperson sets the confirmation printing mode by the same method as that described in FIG. 6 according to the first exemplary embodiment. A description thereof will thus be omitted.

Figure 9:
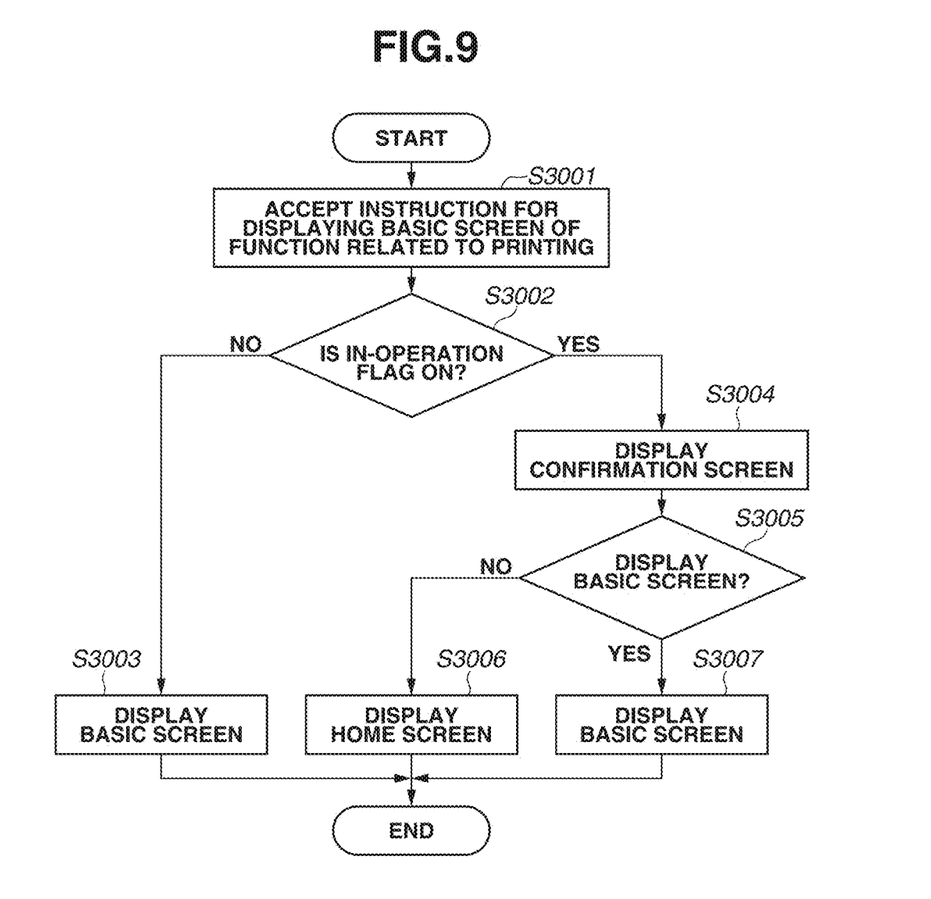
FIG. 9 is a flowchart illustrating processing according to the second exemplary embodiment.

FIG. 9 is a flowchart according to the second exemplary embodiment. To perform the steps of the flowchart illustrated in FIG. 9, the CPU 111 loads a control program stored in the ROM 112 or the storage 114 into the RAM 113 and executes the control program.

In step S3001, the CPU 111 accepts an instruction for displaying the basic screen of a function related to printing. If the user presses the button of a function related to printing, such as the copy function and the facsimile function, on the home screen 700, the CPU 111 receives the instruction for displaying the basic screen of the instructed function on the display 320.

In step S3002, after the instruction for displaying the basic function of the function related to printing is accepted, the CPU 111 checks whether the in-operation flag is on. If the in-operation flag is off (NO in step S3002), the operation mode of the MFP 101 is the normal mode. The processing proceeds to step S3003. In step S3003, the CPU 111 displays the basic screen 400 of the specified function on the display 320 of the operation unit 116.

On the other hand, if the in-operation flag is on (YES in step S3002), the operation mode of the MFP 101 is the confirmation printing mode. The processing proceeds to step S3004. In step S3004, the CPU 111 displays the confirmation screen 701 on the display 320.

After the confirmation screen 701 is displayed on the display 320, the CPU 111 accepts a selection whether to display the basic screen of the function.

In step S3005, the CPU 111 determines whether the user's operation is one for displaying the basic function. After the user selects the function to use, the CPU 111 displays the confirmation screen 701. In such a manner, the user can be notified that the operation mode of the MFP 101 is the confirmation printing mode. The user can also be notified that a print product output when the confirmation printing mode is set is different from a normal print product.

If the user makes an operation for displaying the basic screen, i.e., the user touches or selects the "yes" button 702 on the confirmation screen 701 (YES in step S3005), the processing proceeds to step S3007. In step S3007, the CPU 111 displays the basic screen of the selected function on the display 320. After the CPU 111 displays the basic screen of the selected function on the display 320, the processing illustrated in FIG. 9 is ended.

On the other hand, if the user does not make an operation for displaying the basic screen of the function, i.e., the user touches or selects the "no" button 703 on the confirmation screen 701 (NO in step S3005), the processing proceeds to step S3006. In step S3006, the CPU 111 displays the home screen 700 on the display 320. After the home screen 700 is displayed on the display 320, the processing of FIG. 9 is ended.

In the second exemplary embodiment, after the processing illustrated in FIG. 9 is executed to display the basic screen of the selected function on the display 320, the CPU 111 accepts a job start instruction from the user. After the acceptance of the job start instruction, the CPU 111 executes processing similar to that illustrated in FIG. 7. A description thereof will thus be omitted. Since the confirmation screen 701 is once displayed on the display 320 after the user selects the function to use, the processing of step S2006 does not need to be performed. The confirmation screen 701 is displayed during function selection on the home screen 700, and the confirmation screen 600 is not displayed during printing. Printing can thus be started without the serviceperson operating the confirmation screen 600 upon each test printing.

In the second exemplary embodiment, the confirmation screen 701 is displayed on the display 320 when the user selects a function on the home screen 700. When the user attempts to use a function related to printing by the printing unit, the user can thus be notified that the currently-set operation mode is the confirmation printing mode. That a print product output in the confirmation printing mode is different from one output in the normal mode can be displayed on the display 320 to notify the user that a print product different from one in the normal mode is printed in the confirmation printing mode.

Other Embodiments

In the first and second exemplary embodiments, the confirmation screen 600 or 701 is described to be displayed after an instruction for starting a job is given or during function selection if a function capable of executing printing is selected. However, the facsimile (FAX) function, a function involving printing, can perform printing at timing not intended by the user. Print products of the FAX function may thus be excluded from the ones to not be charged, and the confirmation screen 600 or 701 may be kept hidden.

In the first and second exemplary embodiments, the displayed confirmation screen 600 or 701 is described to notify the user that a print product different from one in the normal mode is output in the confirmation printing mode. Alternatively, a message for notifying the user that a print product in the confirmation printing mode is different from one in the normal mode may be constantly displayed while the confirmation printing mode is set.

In the first and second exemplary embodiments, the grid pattern is described to be used as the predetermined pattern image. However, the predetermined pattern image is not limited to the foregoing pattern. For example, a predetermined stamp may be superimposed and printed on the print data.

In the first and second exemplary embodiments, the CPU 111, in the confirmation printing mode, generates an image of image data that the user wants to print, and then generates image data on which the grid pattern is superimposed. However, the image data that the user wants to print may be superimposed on grid data prepared in advance.

In the first and second exemplary embodiments, the processing according to the flowcharts illustrated in FIGS. 6, 7, and 9 is described to be executed by the CPU 111 of the MFP 101. However, such processing may be executed by a CPU of a computer connected to the MFP 101 via a network.

In the first and second exemplary embodiments, the CPU 111 is described to maintain the operation mode of the MFP 101 in the confirmation printing mode if the user selects the "no" button 602 or 703 in FIG. 4E or 8. However, if the "no" button 602 or 703 is selected on the confirmation screen 600 or 701, the CPU 111 may display a screen for making the user select whether to end the confirmation printing mode on the display 320. This enables a general user other than the serviceperson to end the confirmation printing mode and start printing in the normal mode even when the confirmation printing mode is set.

In the first and second exemplary embodiments, the MFP 101 is described to include the charging counter for counting the number of printed sheets of print products to be charged and the non-charging counter for counting the number of printed sheets of print products to not be charged. However, the image forming apparatus may include only the charging counter without the non-charging counter for counting the number of printed sheets of print products to not be charged.

According to the image forming apparatus disclosed in the present specification, the user attempting to start printing an image can be made aware that the currently-set operation mode is the confirmation printing mode. This can prevent the user from starting printing and wasting sheets without being aware that the confirmation printing mode is set. The image forming apparatus disclosed in the present specification can also make the user attempting to use a function related to printing aware that the currently-set operation mode is the confirmation printing mode.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130610, filed Jun. 30, 2016, which is hereby incorporated by reference herein in its entirety.

What is claimed is:

1. An image forming apparatus comprising:
a processor; and
a memory storing instructions, when executed by the processor, causing the image forming apparatus to function as:
an input unit configured to input image data;
a printing unit configured to print an image based on the image data input by the input unit;
a control unit configured to determine if the image forming apparatus is operating in a first mode or a second mode,
wherein if the control unit determines the image forming apparatus is operating in a first mode then perform control to print by the printing unit an image generated from the image data input by the input unit, and
wherein if the control unit determines the image forming apparatus is operating in a second mode then print by the printing unit an image obtained by adding a predetermined pattern image to the image generated from the image data input by the input unit; and
an operation unit including a display and accepting unit,
wherein if the image forming apparatus operates in the second mode, display a confirmation screen to a user prior to printing to accept selection regarding whether to perform printing in the second mode in response to operation performed to start printing the image.

2. The image forming apparatus according to claim 1, further comprising a charging counter configured to update its count in response to execution of printing by the printing unit,
wherein if the image forming apparatus operates in the first mode, the count of the charging counter is updated in response to the execution of printing by the printing unit, and if the image forming apparatus operates in the second mode, the count of the charging counter is not updated.

3. The image forming apparatus according to claim 2, further comprising a non-charging counter configured to, if the image forming apparatus operates in the second mode, update its count in response to the execution of printing by the printing unit.

4. The image forming apparatus according to claim 1, wherein the display is for making a notification that if the image forming apparatus operates in the second mode, a print product different from one printed by the printing unit when the image forming apparatus operates in the first mode is printed.

5. The image forming apparatus according to claim 1, further comprising a reading unit configured to read a document and generate the image data,
wherein the printing unit is capable of printing the image based on the image data generated by the reading unit.

6. The image forming apparatus according to claim 1, further comprising a setting unit configured to make a setting so that the image forming apparatus operates in the second mode.

7. The image forming apparatus according to claim 1, wherein the predetermined pattern image has a grid pattern.

8. An image forming apparatus comprising:
a processor; and
a memory storing instructions, when executed by the processor, causing the image forming apparatus to function as:
an input unit configured to input image data;
a printing unit configured to print an image based on the image data input by the input unit;
a control unit configured to determine if the image forming apparatus is operating in a first mode or a second mode,
wherein if the control unit determines the image forming apparatus is operating in a first mode then perform control to print by the printing unit the image generated from the image data input by the input unit, and
wherein if the control unit determines the image forming apparatus is operating in a second mode then print by the printing unit the image obtained by adding a predetermine pattern image on the image generated from the image data input by the input unit;
an operation unit including a display and input device; and
a notifying unit configured to, if the image forming apparatus operates in the second mode, notify a user with a confirmation screen on the display prior to printing that the second mode is set in response to selection of a function capable of printing by the printing unit.

9. A method for controlling an image forming apparatus including a printing unit configured to print an image, the method comprising:
inputting image data;
printing the image based on the image data input in the inputting;
determining if the image forming apparatus is operating in a first mode or a second mode;
performing control to print by the printing unit the image generated from the image data input by the inputting if the control unit determines the image forming apparatus is operating in a first mode;
performing control to print by the printing unit an image obtained by adding a predetermined image to the image generated from the image data input by the inputting if determined the image forming apparatus is operating in a second mode; and
accepting on a confirmation screen of a display prior to printing, if the image forming apparatus operates in the second mode, selection regarding whether to print the image in the second mode in response to acceptance of operation to start printing the image.

10. A non-transitory computer-readable storage medium storing a program for executing a method for controlling an image forming apparatus including a printing unit configured to print an image, the method comprising:
inputting image data;
printing the image based on the image data input in the inputting;
determining if the image forming apparatus is operating in a first mode or a second mode;
performing control to print by the printing unit the image generated from the image data input by the inputting if the control unit determines the image forming apparatus is operating in a first mode; and
performing control to print by the printing unit an image obtained by adding a predetermined image to the image generated from the image data input by the inputting if determined the image forming apparatus is operating in a second mode; and
accepting on a confirmation screen of a display prior to printing, if the image forming apparatus operates in the second mode, selection regarding whether to print the image in the second mode in response to acceptance of operation to start printing the image.

* * * * *